United States Patent
Heukensfeldt Jansen et al.

(10) Patent No.: US 12,440,178 B2
(45) Date of Patent: Oct. 14, 2025

(54) SYSTEM AND METHOD FOR UTILIZING VARIABLE RADIAL SINOGRAM DIMENSION FOR POSITRON EMISSION TOMOGRAPHY IMAGING

(71) Applicant: GE Precision Healthcare LLC, Wauwatosa, WI (US)

(72) Inventors: Floribertus Philippus Martinus Heukensfeldt Jansen, Ballston Lake, NY (US); Timothy Wayne Deller, Brookfield, WI (US)

(73) Assignee: GE PRECISION HEALTHCARE LLC, Wauwatosa, WI (US)

( * ) Notice: Subject to any disclaimer, the term of this patent is extended or adjusted under 35 U.S.C. 154(b) by 372 days.

(21) Appl. No.: 18/111,198

(22) Filed: Feb. 17, 2023

(65) Prior Publication Data
US 2024/0277304 A1  Aug. 22, 2024

(51) Int. Cl.
 *A61B 6/03* (2006.01)
 *A61B 6/00* (2024.01)
 *A61B 6/42* (2024.01)
 *G06T 11/00* (2006.01)

(52) U.S. Cl.
 CPC .......... *A61B 6/037* (2013.01); *A61B 6/4266* (2013.01); *A61B 6/5205* (2013.01); *A61B 6/5294* (2013.01); *G06T 11/003* (2013.01); *A61B 6/488* (2013.01)

(58) Field of Classification Search
 CPC ..... A61B 6/037; A61B 6/4266; A61B 6/5205; A61B 6/5294; A61B 6/488; G06T 11/003; G06T 11/005
 See application file for complete search history.

(56) References Cited

U.S. PATENT DOCUMENTS

| | | | |
|---|---|---|---|
| 11,544,419 B1 * | 1/2023 | Wingfield | G06T 19/00 |
| 11,576,629 B1 | 2/2023 | Heukensfeldt Jansen | |
| 2023/0046516 A1 * | 2/2023 | Heukensfeldt Jansen | A61B 6/4266 |

FOREIGN PATENT DOCUMENTS

WO   WO-2020123846 A1 *  6/2020  ........... G01T 1/2018

OTHER PUBLICATIONS

Cherry et al., "Total-Body PET: Maximizing Sensitivity to Create New Opportunities for Clinical Research and Patient Care," 2018, Society of Nuclear Medicine and Molecular Imaging, 10 pgs.

Daube-Witherspoon et al., "Treatment of Axial Data in Three-Dimensional PET," The Journal Nuclear Medicine, vol. 28, No. 11, Nov. 1987, 8 pgs.

Fahey "Data Acquisition in PET Imaging," The Journal Nuclear Medicine, vol. 30, No. 2, Jun. 2002, 12 pgs.

(Continued)

*Primary Examiner* — Casey Bryant
(74) *Attorney, Agent, or Firm* — Fletcher Yoder, P.C.

(57) ABSTRACT

A method and a system for limiting coincidence data includes detecting a plurality of coincidence events during a scan of a subject with a detector array of a positron emission tomography (PET) scanner, wherein the PET scanner includes a plurality of detector rings disposed along a longitudinal axis of the PET scanner, and each detector ring includes a plurality of detectors. The method also includes limiting data associated with the plurality of coincidence events from the scan so that the data varies in a radial extent relative to a center of a field of view of the scan.

20 Claims, 11 Drawing Sheets

(56) References Cited

OTHER PUBLICATIONS

Karp et al., "PennPET Explorer: Design and Preliminary Performance of a Whole-Body Imager," The Journal Nuclear Medicine, vol. 61, No. 1, Jan. 2020, 8 pgs.
Leung et al., "Relating 18 F-FDG image signal-to-noise ratio to time-of-flight noise-equivalent count rate in total-body PET using the uEXPLORER scanner," Institute of physics and Engineering in Medicine, 2022, 26 pgs.
Pantel et al., "PennPET Explorer: Human Imaging on a Whole-Body Imager," The Journal Nuclear Medicine, vol. 61, No. 1, Jan. 2020, 8 pgs.
Schmall et al., "Parallax error in long-axial field-of-view PET scanners—a simulation study," Institute of Physics and Engineering in Medicine, Physics in Medicine & Biology 61, 2016, 14 pgs.
Spencer et al., "Performance Evaluation of the uEXPLORER Total-Body PET/CT Scanner Based on NEMA NU Feb. 2018 with Additional Tests to Characterize PET Scanners with a Long Axial Field of View ," The Journal Nuclear Medicine, vol. 62, 2021, 10 pgs.
Surti et al., "Total Body PET: Why, How, What for?," IEEEE, 2020, 10 pgs.
Viswanath et al., "Development of PET for Total-Body Imaging*," 2nd Jagiellonian Symposium on Fundamental and Applied Sub-atomic Physics, Kraków, Poland, Jun. 3-11, 2017, 13 pgs.

\* cited by examiner

SYSTEM AND METHOD FOR UTILIZING VARIABLE RADIAL SINOGRAM DIMENSION FOR POSITRON EMISSION TOMOGRAPHY IMAGING

BACKGROUND

The subject matter disclosed herein relates to imaging systems, and more particularly to positron emission tomography (PET) imagining systems.

A PET imaging system generates images that represent the distribution of positron-emitting nuclides within the body of a patient. When a positron interacts with an electron by annihilation, the entire mass of the positron-electron pair is converted into two 511 keV photons. The photons are emitted in opposite directions along a line of response. The annihilation photons (known as (2) singles) are detected by detectors that are placed along the line of response on a detector ring. When these photons arrive and are detected at the detector elements at the same time, this is referred to as coincidence or coincidence event (COIN). An image is then generated, based on the acquired data that includes the annihilation photon detection information.

A desire for greater sensitivity in PET has led to an increase in the axial field of view (FOV) of PET scanners along the longitudinal axis of the scanners. The number of crystal pairs in a large axial FOV PET system is very large (e.g., reaching the order of one hundred billion). This presents acquisition demands, data storage demands, and computational demands. As a result, the number of lines of response (LORs) acquired (reconstructed) is often limited. Some of the LORs in a system contain more valuable information than others. For example, as the PET scanners have increased in axial length, an axial angle (e.g., of a line through a center point of the detector and two different crystal rows) between two distant crystal rows becomes steeper, thus, reducing the information useful for reconstruction. This is primarily because the LOR has a longer path through the patient, and therefore is more likely to scatter or attenuate. Additionally, there are resolution challenges with a large axial angle due to increased parallax effect. Further, the random events (which are a source of statistical noise) are essentially unchanged based on the steeper axial angle, while the true signal is reduced. For these reasons, the overall quality of the signal for the steeper angles degrades with increasing axial angle.

Typically, the primary way of reducing the valid number of LORs (in acquisition, data storage, and/or reconstruction) is limiting the axial acceptance based on the crystal ring difference for each coincidence event (i.e., the difference in the z-axis crystal indices). With this approach, the number of samples in the radial dimension of the sinogram have always been kept fixed for a single saved dataset, regardless of the ring difference.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a method for limiting coincidence data is provided. The method includes detecting a plurality of coincidence events during a scan of a subject with a detector array of a positron emission tomography (PET) scanner, wherein the PET scanner includes a plurality of detector rings disposed along a longitudinal axis of the PET scanner, and each detector ring includes a plurality of detectors. The method also includes limiting data associated with the plurality of coincidence events from the scan so that the data varies in a radial extent relative to a center of a field of view of the scan.

In another embodiment, a system for limiting coincidence data is provided. The system includes a memory encoding processor-executable routines. The system also includes a processor configured to access the memory and to execute the processor-executable routines, wherein the processor-executable routines, when executed by the processor, cause the processor to perform actions. The actions include detecting a plurality of coincidence events during a scan of a subject with a detector array of a positron emission tomography (PET) scanner, wherein the PET scanner includes a plurality of detector rings disposed along a longitudinal axis of the PET scanner, and each detector ring includes a plurality of detectors. The actions also include limiting data associated with the plurality of coincidence events from the scan so that the data varies in a radial extent relative to a center of a field of view of the scan.

In a further embodiment, a non-transitory computer-readable medium is provided. The computer-readable medium includes processor-executable code that when executed by a processor, causes the processor to perform actions. The actions include detecting a plurality of coincidence events during a scan of a subject with a detector array of a positron emission tomography (PET) scanner, wherein the PET scanner includes a plurality of detector rings disposed along a longitudinal axis of the PET scanner, and each detector ring includes a plurality of detectors. The actions also include limiting data associated with the plurality of coincidence events from the scan so that the data varies in a radial extent relative to a center of a field of view of the scan. The data varies in the radial extent for the plurality of coincidence events based on different respective values for a numerical difference in detector rings along the longitudinal axis between a first detector and a second detector detecting a respective coincidence event.

BRIEF DESCRIPTION OF THE DRAWINGS

These and other features, aspects, and advantages of the present subject matter will become better understood when the following detailed description is read with reference to the accompanying drawings in which like characters represent like parts throughout the drawings, wherein.

DETAILED DESCRIPTION

Figure 1:
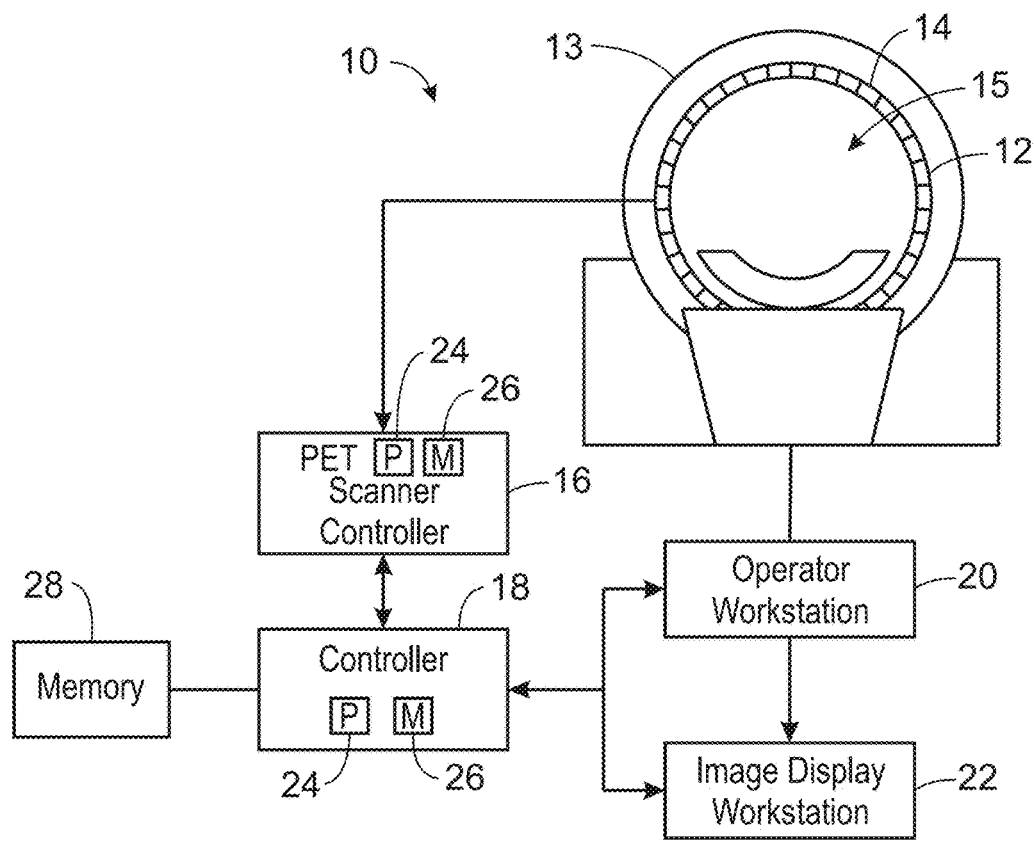
FIG. 1 is a diagrammatical representation of an embodiment of a positron emission tomography (PET) imaging system, in accordance with aspects of the present disclosure.

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present subject matter, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

Various embodiments provide a system and method for limiting coincidence data utilized in PET imaging. In particular, the disclosed embodiments provide ways to reduce a valid number of LORs by selecting which LORs to save and/or to utilize in reconstruction by allowing for a variable radial dimension size within a single dataset (i.e., data acquired. In particular, the disclosed embodiments include detecting a plurality of coincidence events during a scan of a subject (e.g., patient or object) with a detector array of a PET scanner, wherein the PET scanner includes a plurality of detector rings disposed along a longitudinal axis of the PET scanner, and each detector ring includes a plurality of detectors. The disclosed embodiments also include limiting data associated with the plurality of coincidence events from the scan so that the data varies in a radial extent relative to a center of a field of view of the scan. The data varies in the radial extent for the plurality of coincidence events based on different respective values for a numerical difference in detector rings along the longitudinal axis between a first detector and a second detector detecting a respective coincidence event.

In certain embodiments, limiting the data associated with the plurality of coincidence events is based on an axial angle for each respective coincidence event, wherein the axial angle is between a line of response (LOR) of the respective coincidence event and a line parallel to a vertical axis (e.g., y-axis), the vertical axis being orthogonal to the longitudinal axis of the PET scanner. The axial angle varies radially relative to the center of the field of view for each respective value for the numerical difference. In certain embodiments, limiting the data includes storing only the data where the axial angle is at or below an axial angle limit, wherein the data stored varies in the radial extent. In certain embodiments, the limited data is stored in histogram mode (sinogram mode). In histogram mode, the number of coincidences for each crystal pair (or group of crystal pairs) is counted over the scan duration. In certain embodiments, the limited data is stored in list mode. In list mode, every coincidence event is recorded (including the indices of the involved crystals and the timing information). In certain embodiments, the disclosed embodiments include storing all of the data associated with the plurality of coincidence events from the scan, and then limiting the data by selecting and utilizing only the stored data in reconstructing a PET scan image where the axial angle is at or below an axial angle limit for the stored data, wherein the stored data selected and utilized in reconstruction varies in the radial extent.

Alternatively, in certain embodiments, the known spatial support of the imaged subject may be utilized in limiting the data associated with a plurality of coincidence events (i.e., determining the radial bins to utilize). For example, limiting the data associated with the plurality of coincidence events includes obtaining anatomical scan data (from computed tomography (CT) imaging data or magnetic resonance imaging (MRI) data) of the subject, extracting boundaries of the subject based on the anatomical scan data. The boundaries are then mapped to the data associated with the plurality of coincidence events to determine a radial range for the radial extent of the data that covers at least the subject. The data falling within the radial range is stored. The stored data varies in the radial extent.

In certain embodiments, other metrics may be utilized in limiting the data associated with a plurality of coincidence events (i.e., determining the radial bins to utilize). For example, corrections-based metrics may be utilized. In particular, data corrections for reconstruction provide information related to the usefulness of LORs. In certain embodiments multiplicative corrections such as system geometric calibrations or normalization may be utilized to limit the coincidence data. In certain embodiments, an angle of incidence of the LOR path to crystal face may be utilized to limit the coincidence data. In certain embodiments, the metrics to limit the coincidence data may provide a statistical measure of usefulness of a particular LOR. These types of metrics may include an estimate of random events or an estimate of scattered events. In certain embodiments a count rate may be utilized as a factor to adaptively adjust the number of LORs saved or utilized. In certain embodiments, an attenuation factor computed along a LOR may be utilized as a factor to adjust the number of LORs saved or utilized. These metrics may be utilized in combination with each other and/or with the techniques above (e.g., axial angle or known spatial support).

The disclosed embodiments improve the quality of PET raw data (e.g., in list mode or in histogram mode) that is captured for a given amount of memory. The disclosed embodiments also reduce the demands on the acquisition system (of a PET imaging system), reduce necessary storage, and/or reduce computational burden on image reconstruction. This can lead to reduced system cost, reduced data storage needed, and decreased reconstruction computation time. The disclosed embodiments further improve image quality.

With the foregoing in mind and turning now to the drawings, FIG. 1 depicts a PET imaging system 10 operating in accordance with certain aspects of the present disclosure. The PET imaging system of FIG. 1 may be utilized with a dual-modality imaging system such as a PET/CT imaging or PET/MRI imaging.

Returning now to FIG. 1, the depicted PET imaging system 10 includes a detector array 12. The detector array 12 of the PET imaging system 10 typically includes a number of detector modules or detector channels (generally designated by reference numeral 14) arranged in one or more rings, as depicted in FIG. 1. Each detector module 14 may include a scintillator block (e.g., having a plurality of scintillation crystals) and a photomultiplier tube (PMT) or other light sensor or photosensor (e.g. silicon avalanche photodiode, solid state photomultiplier, etc.). In certain embodiments, a respective photosensor is associated with a respective scintillator crystal. The PET imaging system 10 includes a gantry 13 that is configured to support a full ring annular detector array 12 thereon. The detector array 12 is positioned around the central opening/bore 15 and can be controlled to perform a normal "emission scan" in which positron annihilation events are counted. To this end, the detector modules 14 forming the detector array 12 generally generate intensity output signals corresponding to each annihilation photon (which are acquired by acquisition circuitry coupled to the detector modules 14).

The depicted PET imaging system 10 also includes a PET scanner controller 16, a controller 18, an operator workstation 20, and an image display workstation 22 (e.g., for displaying an image). In certain embodiments, the PET scanner controller 16, controller 18, operator workstation 20, and image display workstation 22 may be combined into a single unit or device or fewer units or devices.

The PET scanner controller 16, which is coupled to the detector array 12, may be coupled to the controller 18 to enable the controller 18 to control operation of the PET scanner controller 16. Alternatively, the PET scanner controller 16 may be coupled to the operator workstation 20 which controls the operation of the PET scanner controller 16. In operation, the controller 18 and/or the workstation 20 controls the real-time operation of the PET imaging system 10. One or more of the PET scanner controller 16, the controller 18, and/or the operation workstation 20 may include a processor 24 and/or memory 26. In certain embodiments, the PET imaging system 10 may include a separate memory 28. The detector 12, PET scanner controller 16, the controller 18, and/or the operation workstation 20 may include detector acquisition circuitry for acquiring image data from the detector array 12 and image reconstruction and processing circuitry for image processing. The circuitry may include specially programmed hardware, memory, and/or processors.

The processor 24 may include multiple microprocessors, one or more "general-purpose" microprocessors, one or more special-purpose microprocessors, and/or one or more application specific integrated circuits (ASICS), system-on-chip (SoC) device, or some other processor configuration. For example, the processor 24 may include one or more reduced instruction set (RISC) processors or complex instruction set (CISC) processors. The processor 24 may execute instructions to carry out the operation of the PET imaging system 10. These instructions may be encoded in programs or code stored in a tangible non-transitory computer-readable medium (e.g., an optical disc, solid state device, chip, firmware, etc.) such as the memory 26, 28. In certain embodiments, the memory 26 may be wholly or partially removable from the controller 16, 18.

By way of example, PET imaging is primarily used to measure metabolic activities that occur in tissues and organs and, in particular, to localize aberrant metabolic activity. In PET imaging, the patient is typically injected with a solution that contains a radioactive tracer. The solution is distributed and absorbed throughout the body in different degrees, depending on the tracer employed and the functioning of the organs and tissues. For instance, tumors typically process more glucose than a healthy tissue of the same type. Therefore, a glucose solution containing a radioactive tracer may be disproportionately metabolized by a tumor, allowing the tumor to be located and visualized by the radioactive emissions. In particular, the radioactive tracer emits positrons that interact with and annihilate complementary electrons to generate pairs of annihilation photons. In each annihilation reaction, two annihilation photons traveling in opposite directions are emitted. In a PET imaging system 10, the pair of annihilation photons are detected by the detector array 12 configured to ascertain that two annihilation photons detected sufficiently close in time are generated by the same annihilation event. Due to the nature of the annihilation event, the detection of such a pair of annihilation photons may be used to determine the line of response (LOR) along which the annihilation photons traveled before impacting the detector, allowing localization of the annihilation event to that line. By detecting a number of such annihilation photon pairs, and calculating the corresponding lines traveled by these pairs, the concentration of the radioactive tracer in different parts of the body may be estimated and a tumor, thereby, may be detected. Therefore, accurate detection and localization of the annihilation photons forms a fundamental and foremost objective of the PET imaging system 10.

Figure 2:
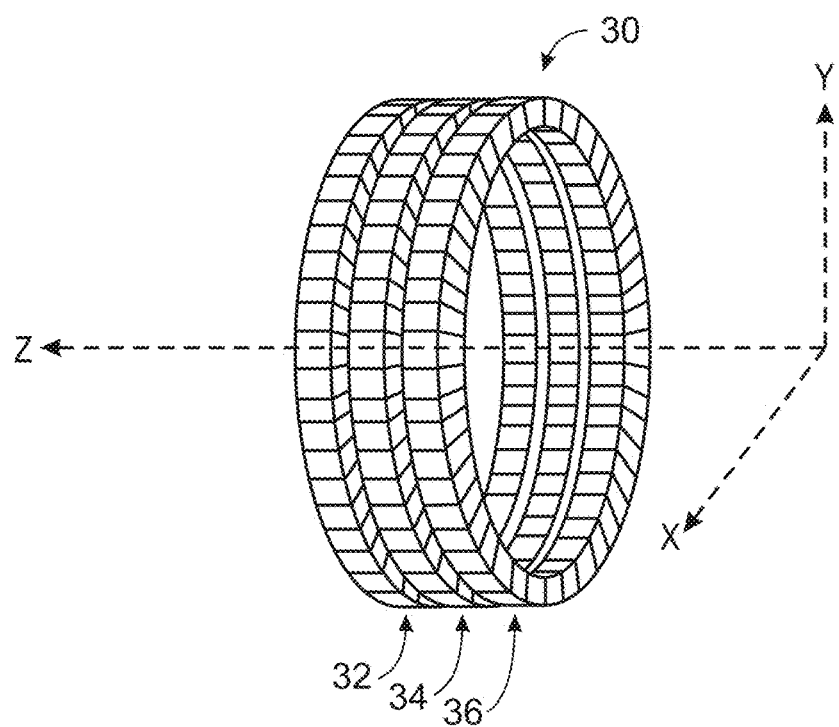
FIG. 2 is a schematic diagram of an embodiment of a 3-D PET scanner, in accordance with aspects of the present disclosure.

Data associated with coincidence events along a number of LORs may be collected and further processed to reconstruct two-dimensional (2-D) tomographic images. Most modern PET scanners can operate in a 3-D mode, where coincidence events from different detector rings positioned along the axial direction are counted to obtain 3-D tomographic images. For example, a PET scanner 30 with multiple detector rings is shown in FIG. 2, where the individual detectors and photosensors are not shown. As shown, the PET scanner 30 includes three detector rings 32, 34 and 36.

The number of detector rings may vary (e.g., 2, 3, 4, 5, or more detector rings). In the disclosed embodiments, coincidence events may occur in different detector rings of different gantry segments of the modular gantry along the axial direction.

Figure 3:
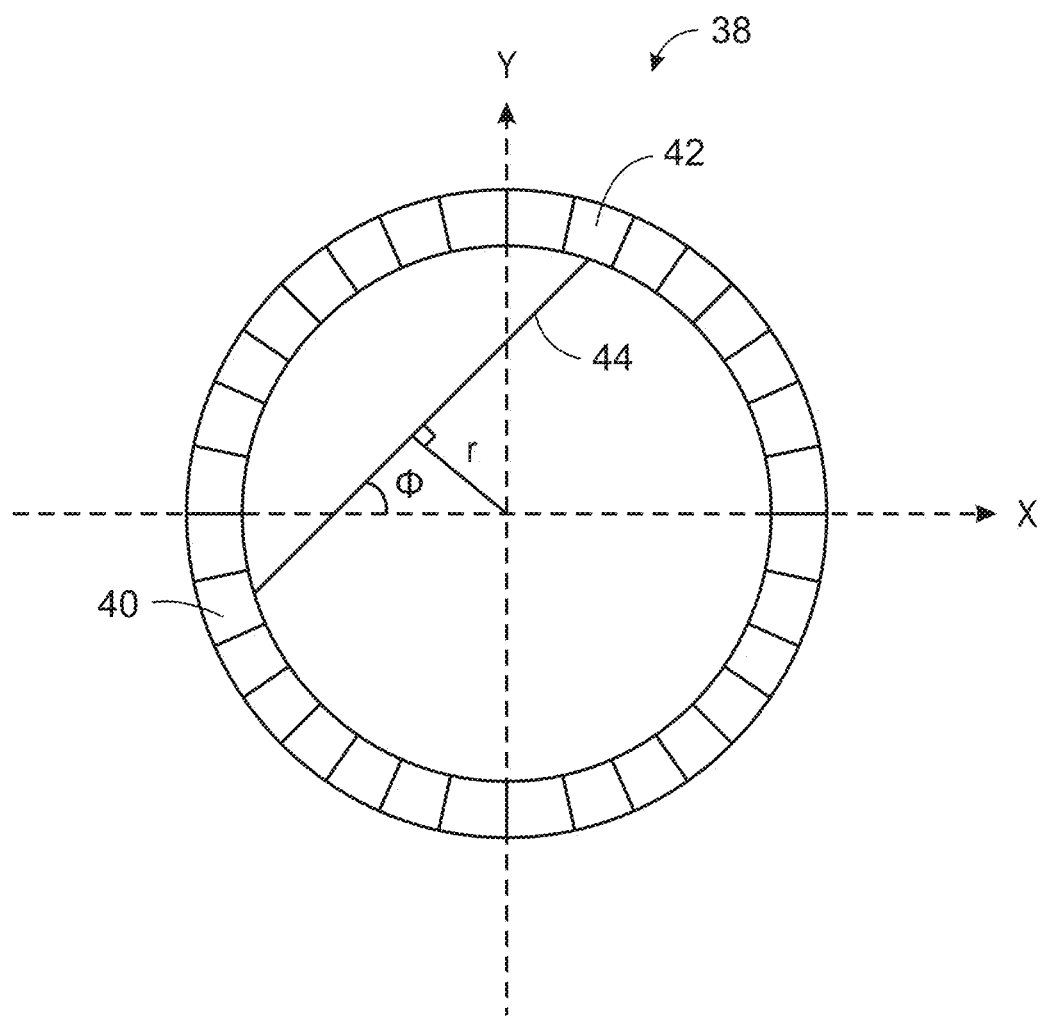
FIG. 3 is a schematic diagram of a line of response (LOR) in a PET imaging system, in accordance with aspects of the present disclosure.

Traditionally, data associated with coincidence events are stored in the form of sinograms based on their corresponding LORs. For example, in a 2-D PET scanner 38 like the one illustrated in FIG. 3, if a pair of coincidence events are detected by two opposite detectors 40 and 42, an LOR may be established as a straight line 44 linking the two detectors 40, 42. This LOR may be identified by two coordinates $(r,\varphi)$, wherein r is the radial distance of the LOR from the center axis of the detector ring 30, and $\varphi$ is the trans-axial angle between the LOR and the X-axis. The detected coincidence events may be recorded in a 2-D matrix $\lambda(r,\varphi)$. As the PET scanner continues to detect coincidence events along various LORs, these events may be binned and accumulated in their corresponding elements in the matrix $\lambda(r,\varphi)$. The result is a 2-D sinogram $\lambda(r,\varphi)$, each element of which holds an event count for a specific LOR. In a 3-D PET scanner, an LOR is defined by four coordinates $(r, \varphi, \theta, z)$, wherein the third coordinate $\theta$ is the axial angle between the LOR and the center axis (or Z-axis as shown in FIG. 2) of the detector rings and z is the distance of the LOR from the center of the detector along the Z-axis. Typically, the third and fourth co-ordinates are combined into only one variable, v, which can define both $\theta$ and z coordinates. In this case, the detected coincidence events are stored in a 3-D sinogram $\lambda(r, \varphi, v)$.

Figure 4:
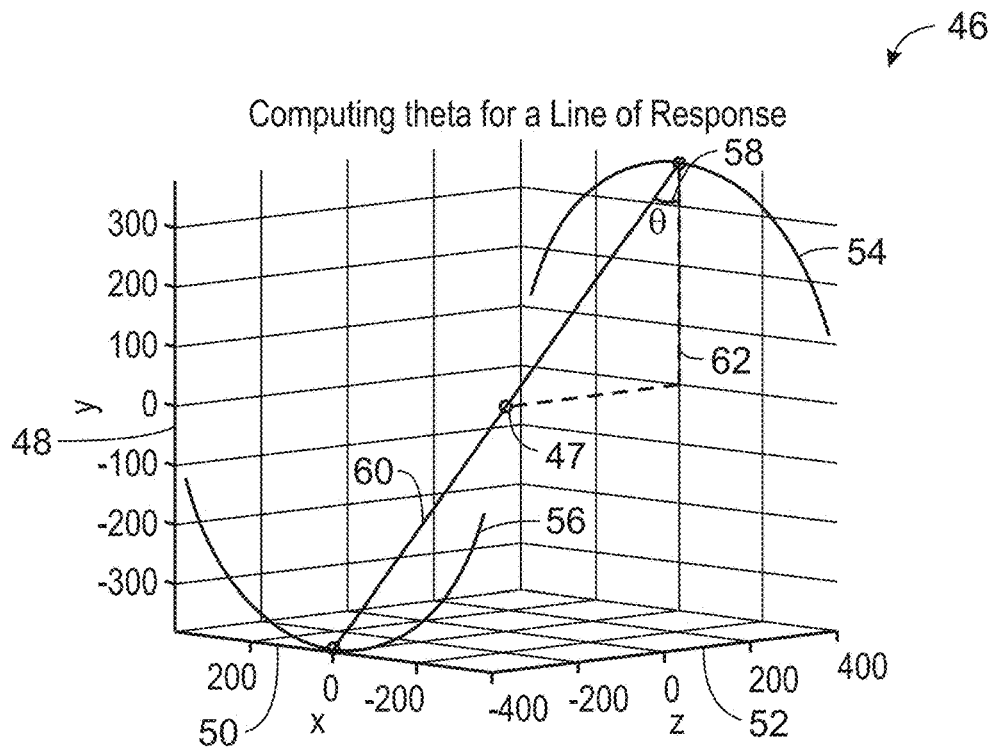
FIG. 4 is a graph illustrating computation of an axial angle (θ or theta) for an LOR (e.g., radially aligned with a center of a field of view), in accordance with aspects of the present disclosure.
Figure 5:
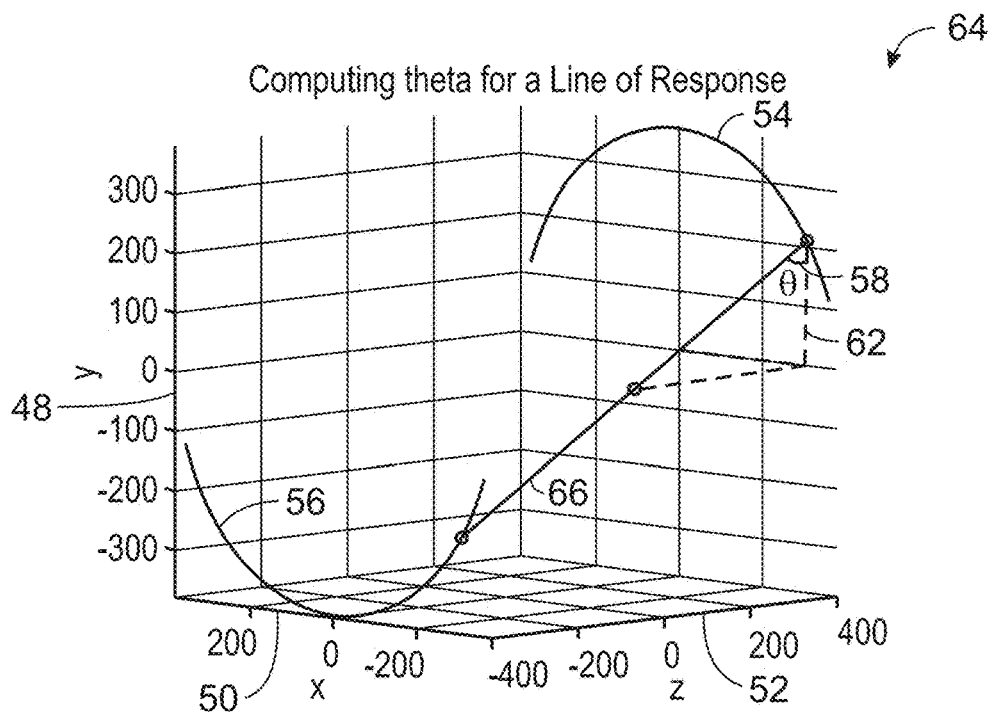
FIG. 5 is a graph illustrating computation of the axial angle for an LOR (e.g., radially offset from the center of the field of view), in accordance with aspects of the present disclosure.

FIG. 4 is a graph 46 illustrating computation of an axial angle ($\theta$ or theta) for an LOR (e.g., radially aligned with a center 47 of a field of view). The graph 46 includes a Y-axis 48 representing a vertical direction, an X-axis 50 representing a radial direction, and a Z-axis 52 representing an axial direction. Zeros on both the Y-axis 48, the X-axis 50, and the Z-axis 52 align with the center 47 of a field of view of a detector of a PET scanner in the vertical direction, the horizontal direction, and the axial direction, respectively. Partial circles 54 and 56 represents portions of two different crystal rows which are 800 millimeters (mm) apart along the Z-axis 52. An axial angle 58 ($\theta$ or theta) is defined as the angle between a LOR 60 (for a pair of coincidence events represented by a straight line between respective detectors on the crystal rows 54, 56) and a line 62 parallel to a vertical axis (i.e., the Y-axis 48). The vertical axis is orthogonal to a longitudinal axis of the detector of the PET scanner (i.e., the Z-axis 52). FIG. 5 is a graph 64 illustrating computation of the axial angle 58 for an LOR 66 (e.g., radially offset from the center 47 of the field of view). The LOR 66 in FIG. 5 extends between the same crystal rows 54, 56 as the LOR 60 in FIG. 4. However, the respective detectors on the crystal rows 54, 56 for the LOR 66 are each at different radial positions compared to the LOR 60 in FIG. 4 and are each radially offset from the center 47 of the field of view along the X-axis 50. The axial angle 58 is clearly larger for the LOR 66 in FIG. 5 than the axial angle 58 for the LOR 60 in FIG. 4 even though the ring difference (difference along the Z-axis) is the same. FIGS. 4 and 5 illustrate that for crystal pairs (scintillation crystal pairs) with the same ring difference, the axial angle 58 can vary significantly due to the curvature of the detector ring. In particular, for a fixed ring difference, the further from the radial center, the greater is the axial angle 58.

Figure 6:
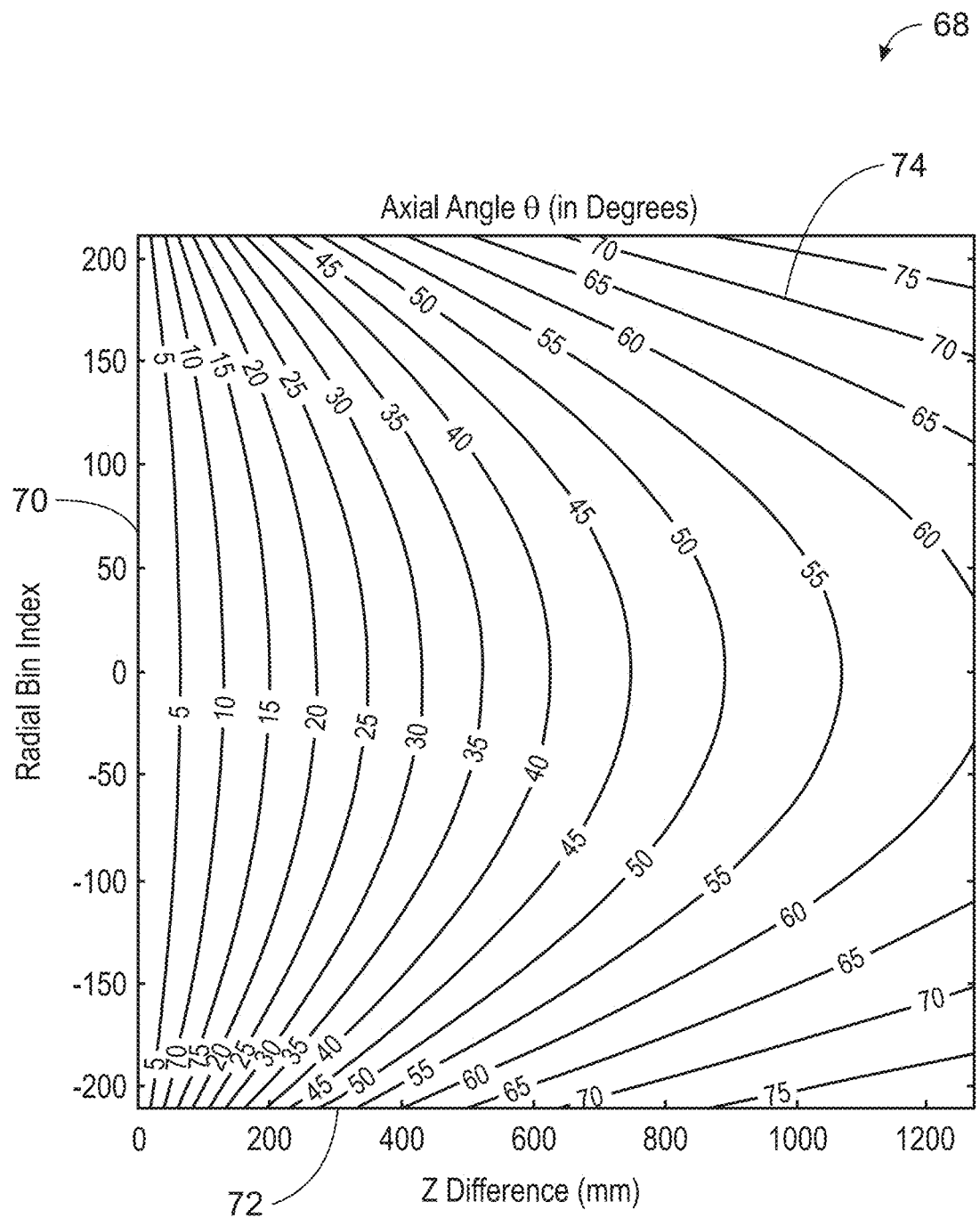
FIG. 6 is a contour plot illustrating an axial angle (θ or theta) relative to a radial dimension and varying ring difference (Z difference), in accordance with aspects of the present disclosure.

FIG. 6 is a contour plot 68 illustrating an axial angle ($\theta$ or theta) relative to a radial dimension and varying ring difference (Z difference). The contour plot 68 includes a Y-axis 70 representing a radial dimension (in sinogram indices or radial bin indices) and an X-axis 72 representing a Z difference (in mm). Contour lines 74 represent the axial angle (in degrees) over the radial dimension 70 and the Z difference 72. As depicted in FIG. 6, for the direct planes (where the Z difference equals zero), the axial angle is always equal to zero. As the ring difference increases, the axial angle increases more rapidly with increasing radial distance from the center of the field of view. This indicates that utilizing metrics that enable the utilization of PET data (representing coincident events from a single dataset gathered from a scan) that vary in a radial extent relative to a center of a field of view of the scan may be useful in limiting coincidence data (e.g., LORs) to the most useful data.

Figure 7:
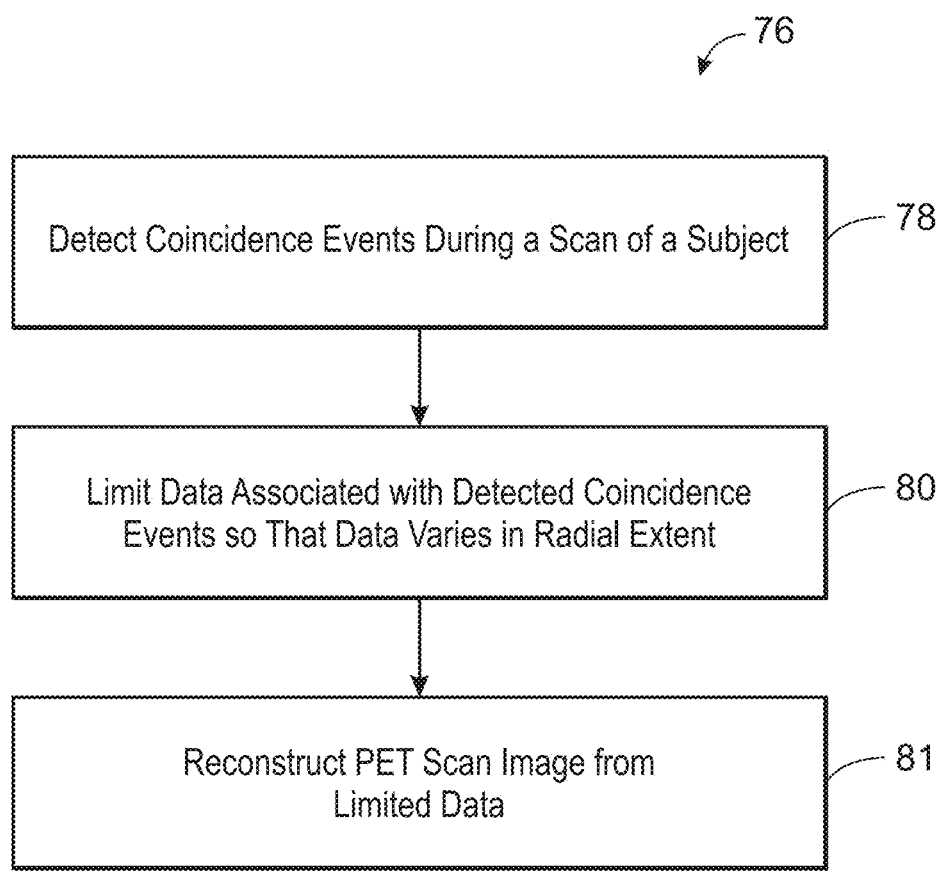
FIG. 7 is a flowchart of a method for limiting coincidence data, in accordance with aspects of the present disclosure.

FIG. 7 is a flowchart of a method 76 for limiting coincidence data. The method 76 may be performed by one or more components of the PET system 10 in FIG. 1 (acquisition circuitry, processing circuitry, etc.). One or more of the steps of the method 76 may be performed at a same time and/or in a different order from that depicted in FIG. 7.

The method 76 includes detecting a plurality of coincidence events during a scan of a subject with a detector array of a PET scanner (block 78). The PET scanner includes a plurality of detector rings disposed along a longitudinal axis of the PET scanner, and each detector ring includes a plurality of detectors. The method 76 also includes limiting data (of a single dataset) associated with the plurality of coincidence events from the scan so that the data (e.g., accepted data) varies in a radial extent relative to a center of a field of view of the scan (block 80). The data (e.g., accepted data) varies in the radial extent for the plurality of coincidence events based on different respective values for a numerical difference in detector rings along the longitudinal axis between a first detector and a second detector detecting a respective coincidence event.

In certain embodiments, limiting the data associated with the plurality of coincidence events is based on an axial angle for each respective coincidence event, wherein the axial angle is between a line of response of the respective coincidence event and a line parallel to a vertical axis, the vertical axis being orthogonal to the longitudinal axis, and the axial angle varies radially relative to the center of the field of view for each respective value for the numerical difference. In certain embodiments, the known spatial support of the imaged subject may be utilized in limiting the data associated with a plurality of coincidence events (i.e., determining the radial bins to utilize).

In certain embodiments, other metrics may be utilized in limiting the data associated with a plurality of coincidence events (i.e., determining the radial bins to utilize). For example, corrections-based metrics may be utilized. In particular, data corrections for reconstruction provide information related to the usefulness of LORs. In certain embodiments multiplicative corrections such as system geometric calibrations, attenuation, or normalization may be utilized to limit the coincidence data. In certain embodiments, an angle of incidence of the LOR path to crystal face may be utilized to limit the coincidence data. In certain embodiments, the metrics to limit the coincidence data may provide a statistical measure of usefulness of a particular LOR. These types of metrics may include an estimate of random events or an estimate of scattered events. In certain embodiments a count rate may be utilized as a factor to adaptively adjust the number of LORs saved or utilized. These metrics may be utilized in combination with each other and/or with the techniques above (e.g., axial angle or known spatial support).

The method 82 further includes reconstructing a PET scan image from the limited data (varying in radial extent) (block 81). Utilization of the limited data with the variable radial extent (i.e., more useful information) improves image quality.

Figure 8:
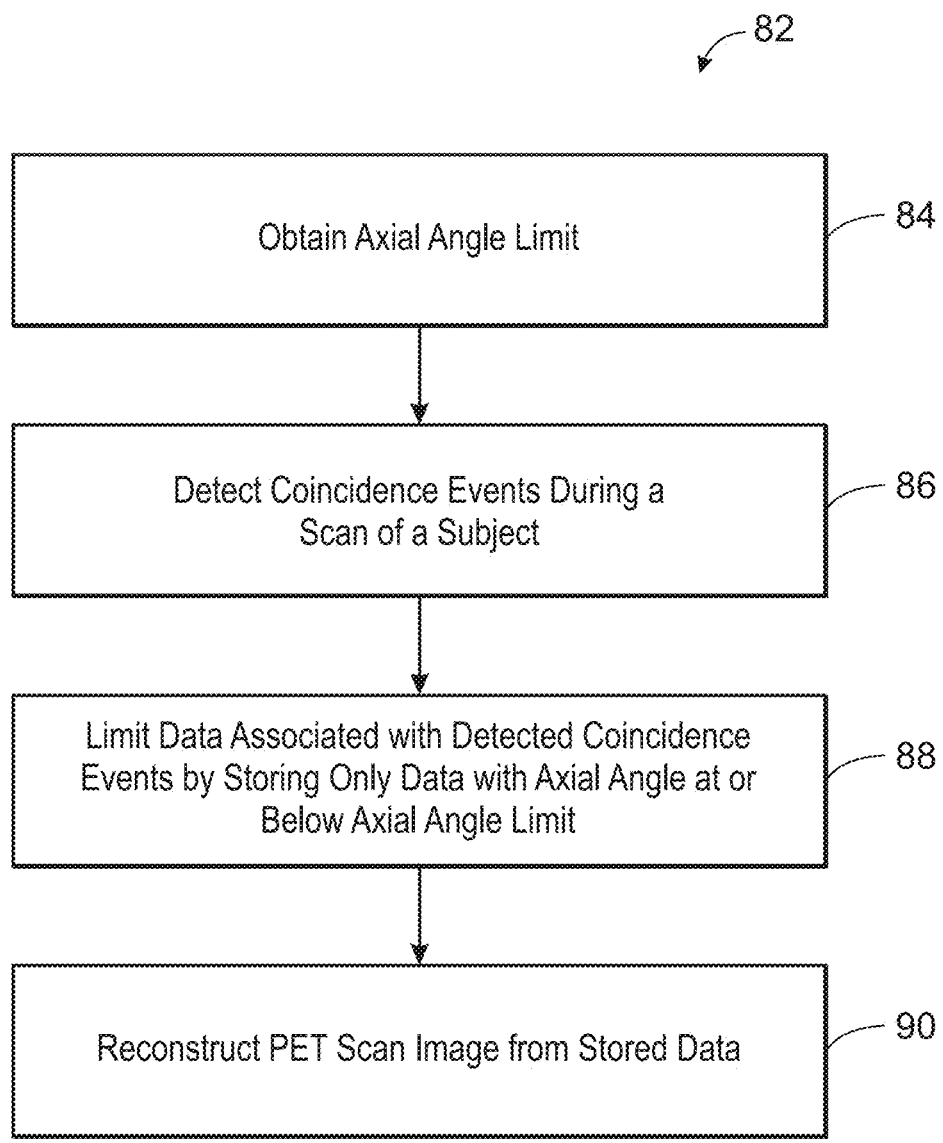
FIG. 8 is a flowchart of a method for limiting coincidence data (e.g., for storing or saving data) utilizing an axial angle limit, in accordance with aspects of the present disclosure.
Figure 9:
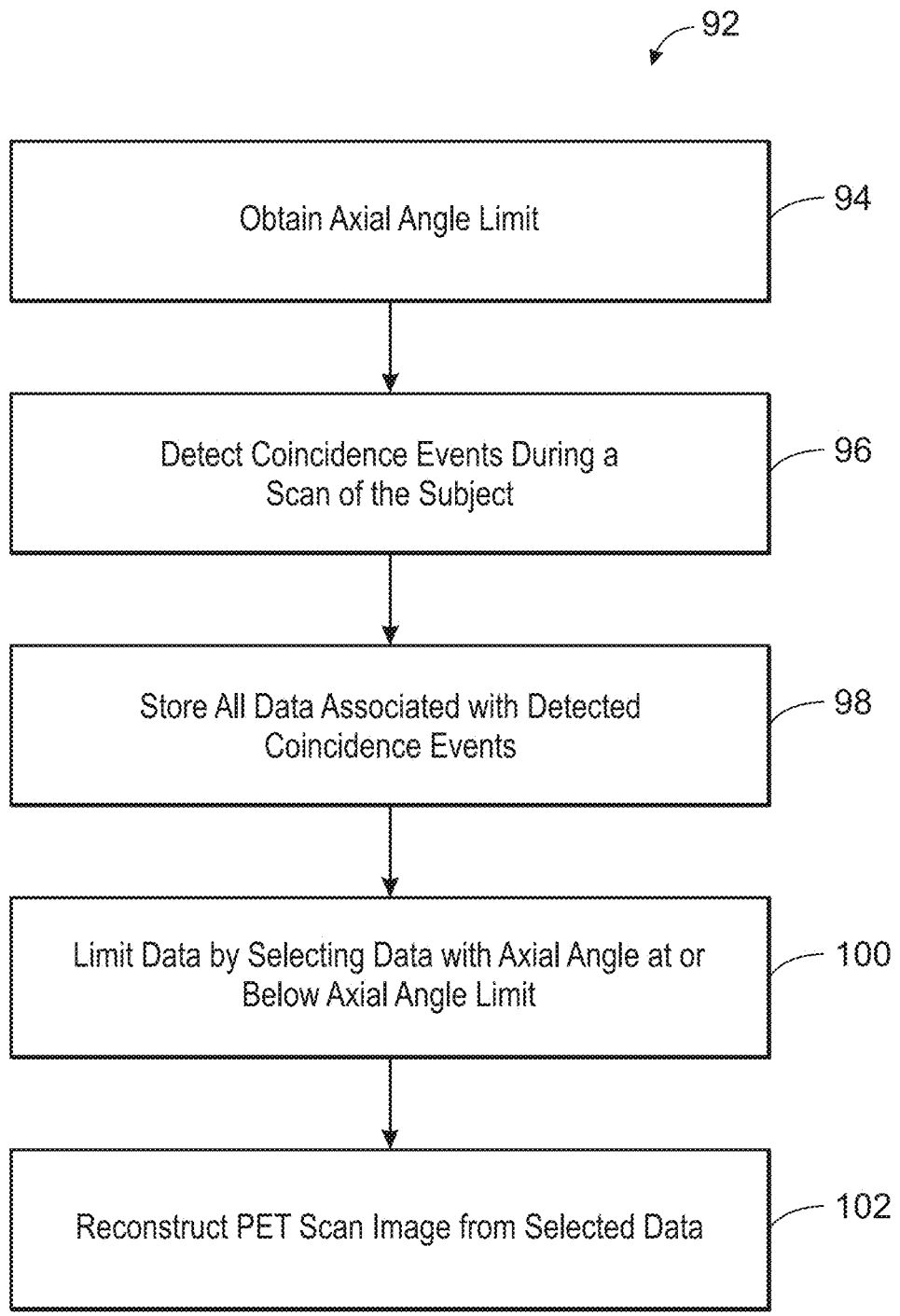
FIG. 9 is a flowchart of a method for limiting coincidence data (e.g., for reconstructing a PET scan image) utilizing an axial angle limit, in accordance with aspects of the present disclosure.

FIGS. 8 and 9 represent methods that enable a varied radial dimension size (instead of a fixed radial dimension size) in order to save the most statistically useful information. FIG. 8 is a flowchart of a method 82 for limiting coincidence data (e.g., for storing or saving data) utilizing an axial angle limit. The method 82 may be performed by one or more components of the PET system 10 in FIG. 1 (acquisition circuitry, processing circuitry, etc.). One or more of the steps of the method 82 may be performed at a same time and/or in a different order from that depicted in FIG. 8.

The method 82 includes obtaining an axial angle limit (block 84). The axial angle is as defined in FIGS. 4 and 5. The axial angle limit serves as threshold or maximum cutoff to limit coincidence data. The method 82 also includes detecting a plurality of coincidence events during a scan of a subject with a detector array of a PET scanner (block 86). The PET scanner includes a plurality of detector rings disposed along a longitudinal axis of the PET scanner, and each detector ring includes a plurality of detectors. The method 82 further includes limiting data (of a single dataset) associated with the plurality of coincidence events from the scan so that the data varies in a radial extent relative to a center of a field of view of the scan based on an axial angle for each respective coincidence event by storing or saving (via the acquisition circuitry) only that data where the axial angle is at or below the axial angle limit, wherein the data stored varies in the radial extent (block 88). The data to be stored or saved is limited based on the comparison of the axial angle of a respective LOR to the axial angle limit. The axial angle is between a line of response of the respective coincidence event and a line parallel to a vertical axis, the vertical axis being orthogonal to the longitudinal axis, and the axial angle varies radially relative to the center of the field of view for each respective value for the numerical difference. The data varies in the radial extent for the plurality of coincidence events based on different respective values for a numerical difference in detector rings along the longitudinal axis between a first detector and a second detector detecting a respective coincidence event. In certain embodiments, the limited data is stored in histogram mode (sinogram mode). In histogram mode, the number of coincidences for each crystal pair (or group of crystal pairs) is counted over the scan duration. In certain embodiments, the limited data is stored in list mode. In list mode, every coincidence event is recorded (including the indices of the involved crystals and the timing information). The method 82 even further includes reconstructing a PET scan image from the stored data (varying in radial extent) (block 90). In certain embodiments, histogram reconstruction is utilized. In certain embodiments, list mode reconstruction is utilized.

FIG. 9 is a method 92 for limiting coincidence data (e.g., for reconstructing a PET scan image) utilizing an axial angle limit. The method 92 may be performed by one or more components of the PET system 10 in FIG. 1 (acquisition circuitry, processing circuitry, etc.). One or more of the steps of the method 92 may be performed at a same time and/or in a different order from that depicted in FIG. 9.

The method 92 includes obtaining an axial angle limit (block 94). The axial angle is as defined in FIGS. 4 and 5. The axial angle limit serves as threshold or maximum cutoff to limit coincidence data. The method 92 also includes detecting a plurality of coincidence events during a scan of a subject with a detector array of a PET scanner (block 96). The PET scanner includes a plurality of detector rings disposed along a longitudinal axis of the PET scanner, and each detector ring includes a plurality of detectors. The method 92 further includes storing or saving in full fidelity (e.g., via the acquisition circuitry) all of the data (of the single dataset) associated with the plurality of coincidence events from the scan (block 98). In certain embodiments, the data is stored in histogram mode (sinogram mode). In histogram mode, the number of coincidences for each crystal pair (or group of crystal pairs) is counted over the scan duration. In certain embodiments, the data is stored in list mode. In list mode, every coincidence event is recorded (including the indices of the involved crystals and the timing information).

The method 92 yet further includes limiting the stored data (of the single dataset) associated with the plurality of coincidence events from the scan so that the data varies in a radial extent relative to a center of a field of view of the scan based on an axial angle for each respective coincidence event by selecting from the stored data only that data where the axial angle is at or below an axial angle limit (block 100). The data is selected (limited) based on the comparison of the axial angle of a respective LOR to the axial angle limit. The axial angle is between a line of response of the respective coincidence event and a line parallel to a vertical axis, the vertical axis being orthogonal to the longitudinal axis, and the axial angle varies radially relative to the center of the field of view for each respective value for the numerical difference. The selected data varies in the radial extent for the plurality of coincidence events based on different respective values for a numerical difference in detector rings along the longitudinal axis between a first detector and a second detector detecting a respective coincidence event. The method 82 still further includes utilizing the selected data in reconstructing a PET scan image (where the selected data has the axial angle at or below an axial angle limit), wherein the selected data utilized in reconstruction varies in the radial extent (block 102). In certain embodiments, histogram reconstruction is utilized. In certain embodiments, list mode reconstruction is utilized. By storing the data in full fidelity and then excluding LORS (utilizing the axial angle limit) computation time may be saved.

Figure 10:
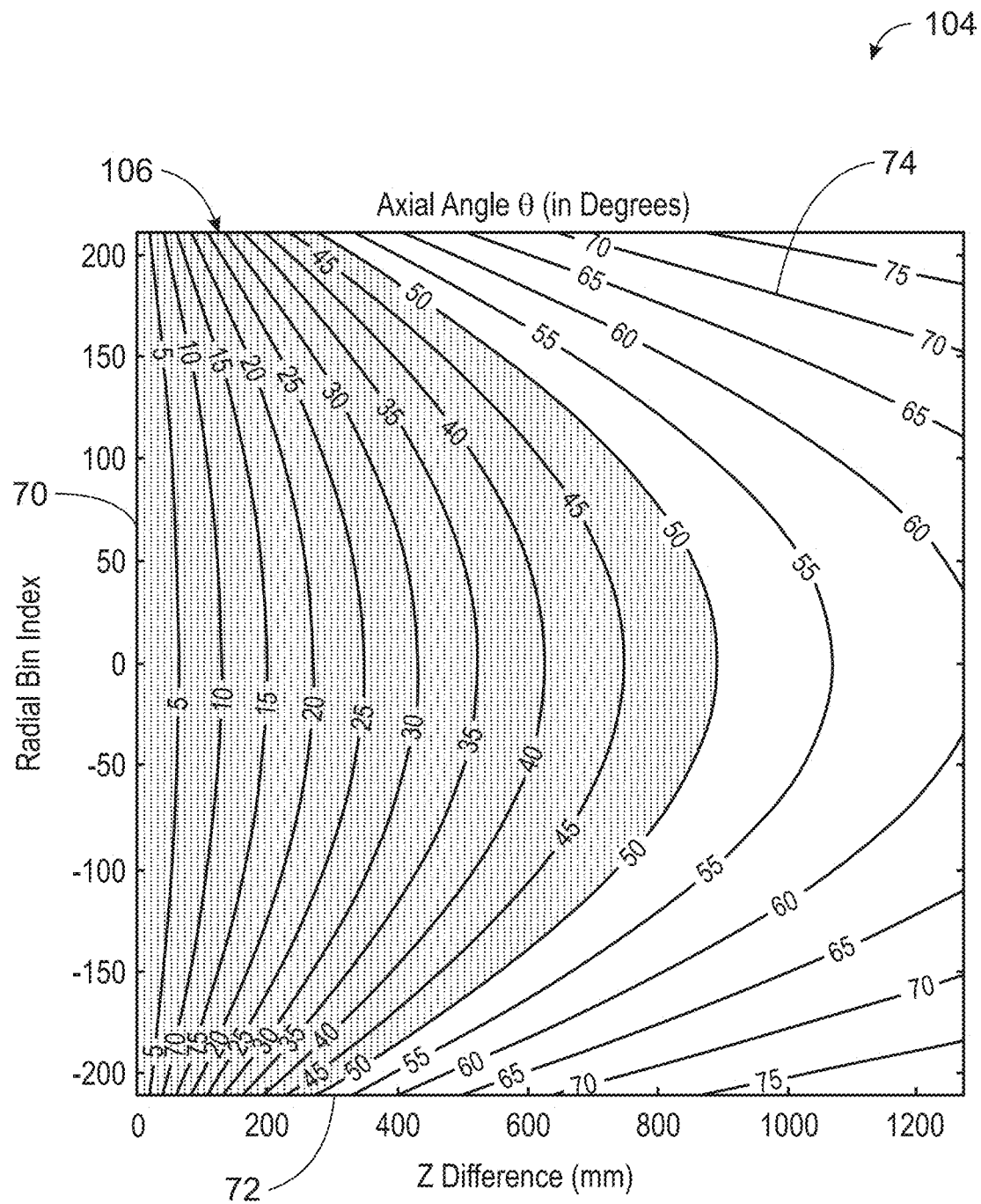
FIG. 10 is a contour plot illustrating an axial angle (θ or theta) relative to a radial dimension and varying ring difference (Z difference) and selection of LORs based on an axial angle limit, in accordance with aspects of the present disclosure.

FIG. 10 is a contour plot 104 illustrating an axial angle ($\theta$ or theta) relative to a radial dimension and varying ring difference (Z difference) and selection of LORs based on an axial angle limit. Similar to the contour plot 68 in FIG. 6, the contour plot 104 includes the Y-axis 70 representing a radial dimension (in sinogram indices or radial bin indices) and the X-axis 72 representing a Z difference (in mm). Contour lines 74 represent the axial angle (in degrees) over the radial dimension 70 and the Z difference 72. Similar to FIG. 6, for the direct planes (where the Z difference equals zero), the axial angle is always equal to zero. As the ring difference increases, the axial angle increases more rapidly with increasing radial distance from the center of the field of view. Shaded region 106 indicates the data retained when utilizing an axial angle limit or maximum axial angle cutoff as discussed above in the methods 82 and 92 of FIGS. 8 and 9, respectively. As depicted in FIG. 10, the axial angle limit is 50 degrees. The variable extent of the radial dimension of the data is shown in FIG. 10. For a ring differences up to 275 mm, the full±211 radial bins would be utilized (e.g. saved or selected). For a ring difference of 740 mm, the central ±100 radial bins would be utilized (e.g., saved or selected). For ring differences above 890 mm, no coincidence data would be utilized (e.g., saved or selected). Utilizing the axial angle limit, only the most statistically useful information is retained.

Figure 11:
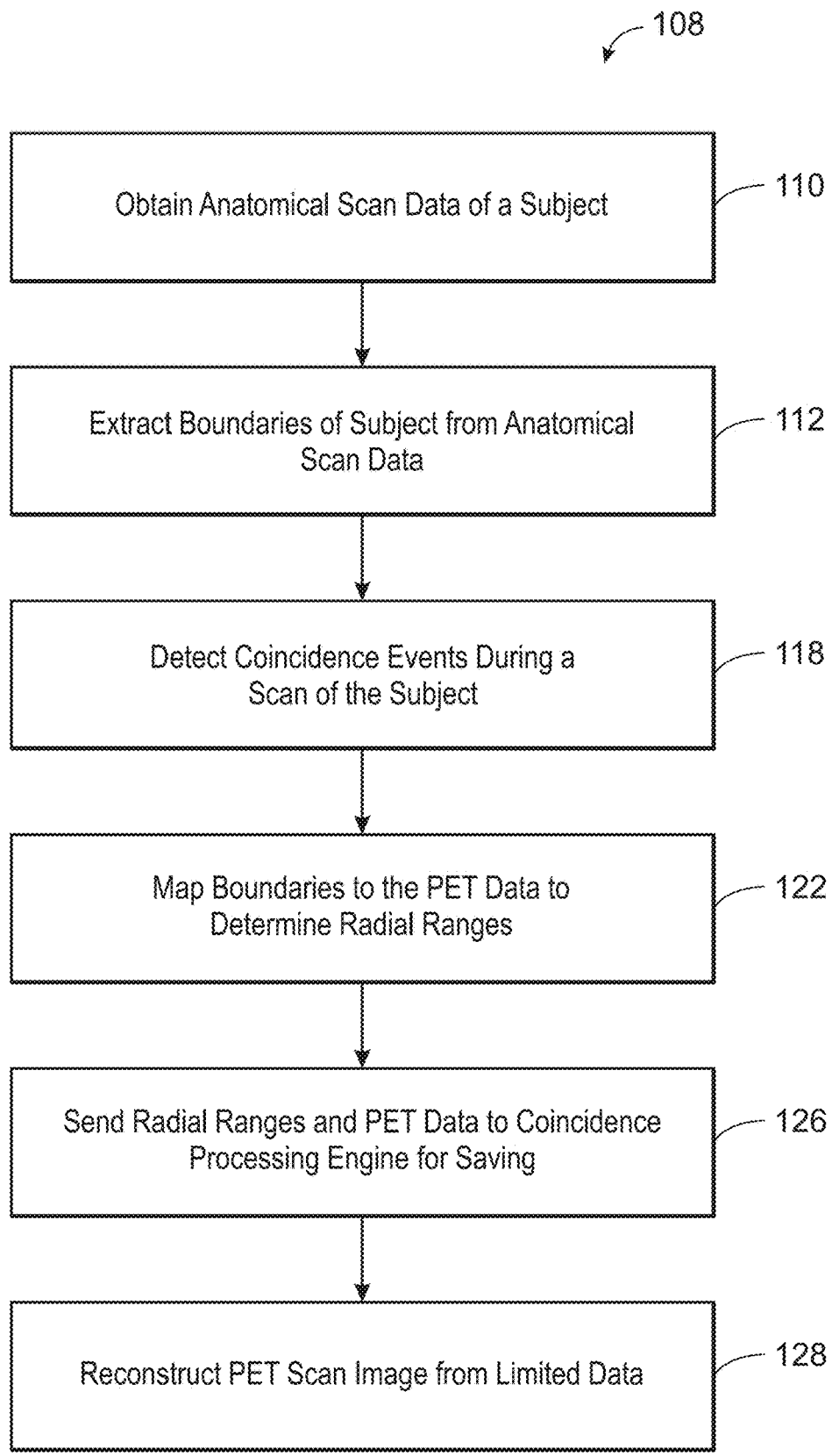
FIG. 11 is a flowchart of a method for limiting coincidence data (e.g., utilizing a known spatial support of the imaged subject), in accordance with aspects of the present disclosure.

FIG. 11 is a method 108 for limiting coincidence data (e.g., utilizing a known spatial support of the imaged subject). The method 108 also utilizes a varied radial dimension size (instead of a fixed radial dimension size) in order to save the most statistically useful information. In utilizing the method 108, the radial extent of the PET data can vary even with a fixed ring difference. The method 108 may be performed by one or more components of the PET system 10 in FIG. 1 (acquisition circuitry, processing circuitry, etc.). One or more of the steps of the method 108 may be performed at a same time and/or in a different order from that depicted in FIG. 11.

The method 108 includes obtaining anatomical scan data of the subject (e.g., object or patient) (block 110). In certain embodiments, the anatomical scan data may be computed tomography (CT) data from a CT scanner. In certain embodiments, the anatomical scan data may be magnetic resonance image (MRI) data from an MRI scanner. The anatomical scan data is of a same region of PET data acquired of the subject. The anatomical scan data may be acquired prior to, at the same time (e.g., when utilizing a PET/MR imaging system), or subsequent to the acquisition of the PET data.

Figure 12:
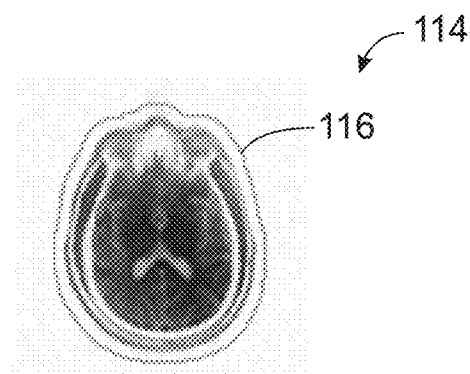
FIG. 12 illustrate a magnetic resonance (MR) image of a subject with extracted boundaries (i.e., identified spatial support), in accordance with aspects of the present disclosure.

Returning to FIG. 11, the method 108 also includes extracting boundaries of the subject based on the anatomical scan data to identify the spatial support of the subject (block 112). In certain embodiments, the extracted boundaries may include a buffer (i.e., designated distance between the subject in the image and the boundary). The buffer allows for patient motion. The buffer also allows for tails data for use with scatter estimation (i.e., fitting a computed sinogram to the tails of the emission sinogram that consist of pure scatter events). FIG. 12 is an example of a MR image 114 of a subject with extracted boundaries 116 (i.e., identified spatial support) with a buffer.

Figure 13:
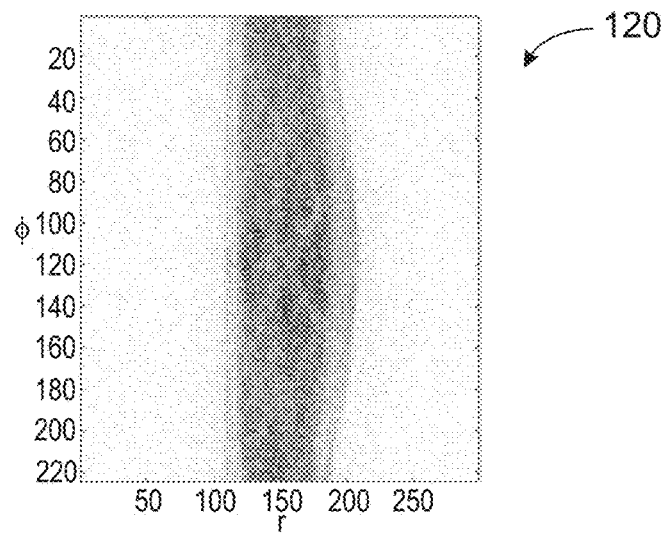
FIG. 13 illustrates a sinogram of PET data acquired of the subject in FIG. 12, in accordance with aspects of the present disclosure.

Returning to FIG. 11, the method 108 also includes detecting a plurality of coincidence events during a scan of a subject with a detector array of a PET scanner (block 118). The PET scanner includes a plurality of detector rings disposed along a longitudinal axis of the PET scanner, and each detector ring includes a plurality of detectors. FIG. 13 is an example of a complete sinogram 120 of PET data acquired of the subject from which the MR image was acquired in FIG. 12.

Figure 14:
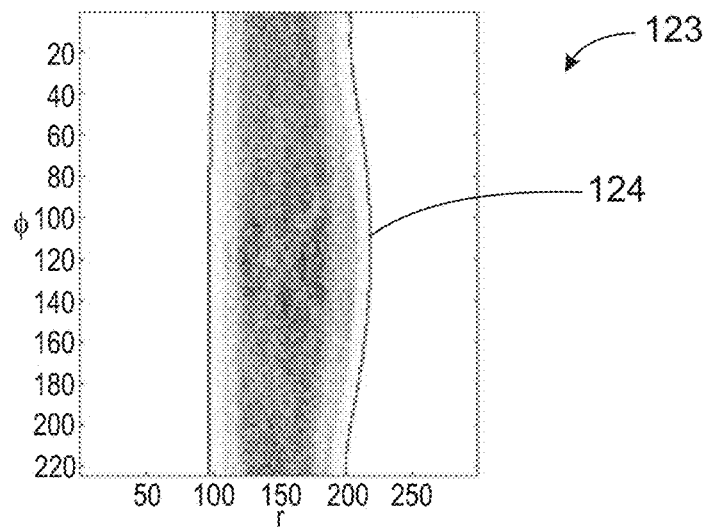
FIG. 14 illustrates a sinogram of the PET data acquired of the subject with boundaries derived from the MR image of the subject, in accordance with aspects of the present disclosure.

Returning to FIG. 11, the method 108 further includes mapping the boundaries to the data associated with the plurality of coincidence events (i.e., PET data in the sinogram 120 in FIG. 12) to determine a radial range for the radial extent of the data that covers at least the subject (block 122). Mapping the boundaries to PET data determines the radial indices to save for various ring pairs and associated azimuthal angles. FIG. 14 illustrates a sinogram 123 (i.e., the sinogram 120 of the PET data acquired of the subject in FIG. 13) with boundaries 124 (including a buffer) (i.e., sensitivity image) derived from the MR image 114 in FIG. 12 of the subject. The LORs to be saved are located within the boundaries 124.

Returning to FIG. 11, the method 108 even further includes sending the radial ranges (and the data to be saved) to the coincidence processing engine for writing (saving) sinogram and/or the list data falling within the radial range, wherein the stored data varies in the radial extent (block 126). The radial ranges are utilized to determine which LORs to save. The radial ranges are also saved with the sinogram or list data for later use. In certain embodiments, the histogram (sinogram) data can be saved as a ragged matrix or a vector (instead of a traditional rectangular sinogram format) along with a small lookup table to identify the radial sample range saved for each projection angle.

The method 108 still further includes reconstructing a PET scan image from the PET data that varies in the radial extent (i.e., the stored data) (block 128). Image reconstruction accounts for the LORs that were acquired (saved) via the sensitivity image in FIG. 14.

Figure 15:
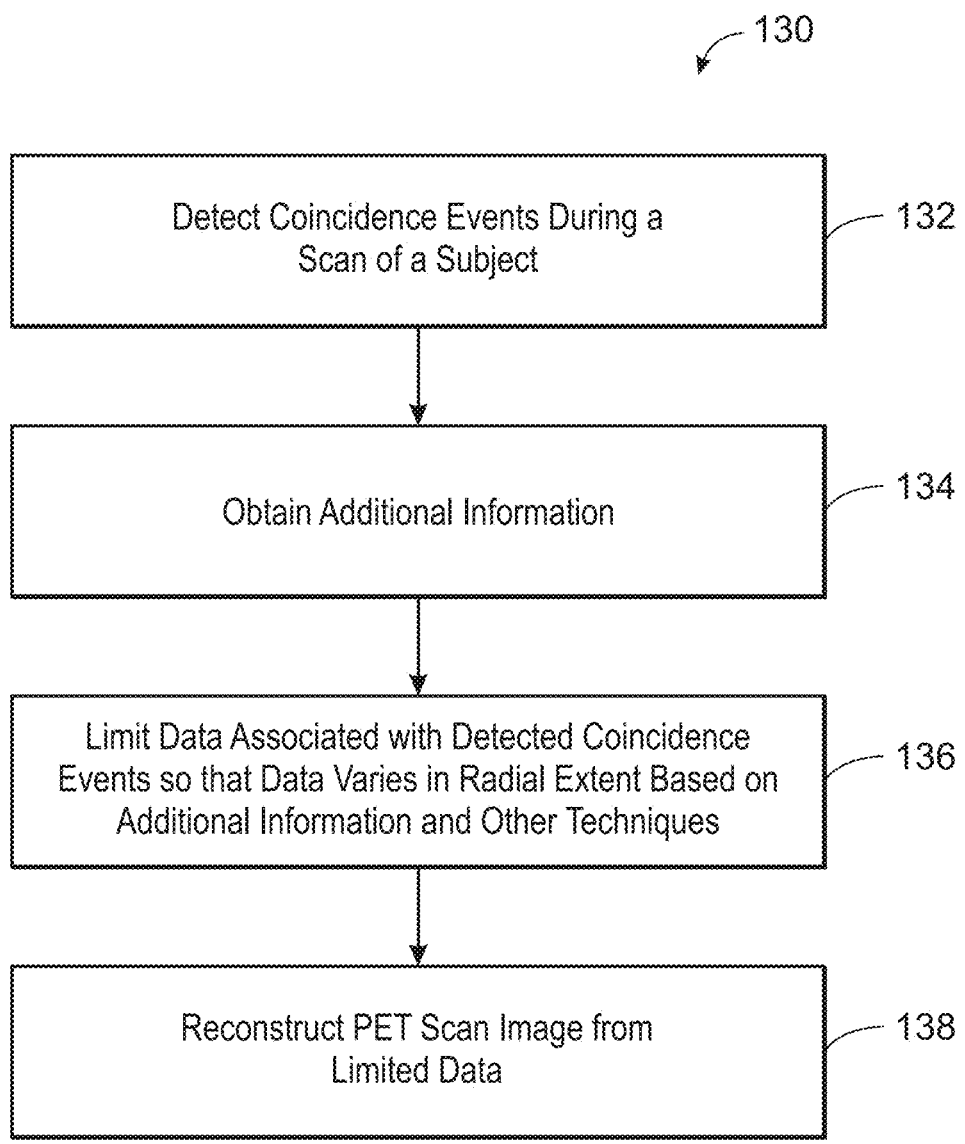
FIG. 15 is a flowchart of a method for limiting coincidence data that utilizes additional information, in accordance with aspects of the present disclosure.

FIG. 15 is a flowchart of a method 130 for limiting coincidence data that utilizes additional information. The method 130 may be performed by one or more components of the PET system 10 in FIG. 1 (acquisition circuitry, processing circuitry, etc.). One or more of the steps of the method 130 may be performed at a same time and/or in a different order from that depicted in FIG. 15.

The method 130 includes detecting a plurality of coincidence events during a scan of a subject with a detector array of a PET scanner (block 132). The PET scanner includes a plurality of detector rings disposed along a longitudinal axis of the PET scanner, and each detector ring includes a plurality of detectors.

The method 130 also includes obtaining additional information related to the PET scan (block 134). In certain embodiments, the additional information includes other metrics that may be utilized in limiting the data associated a plurality of coincidence events (i.e., determining the radial bins to utilize). For example, corrections-based metrics may be utilized. In particular, data corrections for reconstruction provide information related to the usefulness of LORs. In certain embodiments multiplicative corrections such as system geometric calibrations, attenuation correction, or normalization may be utilized to limit the coincidence data. In certain embodiments, these are known beforehand so that they can be directly applied to acquisition. Depending on how the multiplicative corrections are formulated, these corrections may be larger or smaller for LORs in which the system has greater measurement capability. In certain embodiments, these correction-based metrics include an angle of incidence of the LOR path to crystal face that may be utilized to limit the coincidence data. While the axial angle is with respect to the Y-axis, the angle of incidence is with respect to the crystal face. Even for a ring difference of zero, the angle of incidence decreases with increasing radial distance. In certain embodiments, the metrics to limit the coincidence data may provide a statistical measure of usefulness of a particular LOR. These types of metrics may include an estimate of random events or an estimate of scattered events. In certain embodiments a count rate may be utilized as a factor to adaptively adjust the number of LORs saved or utilized. For high count rates (e.g., with dynamic scanning), more aggressive LOR limiting can be applied to reduce demands on the data acquisition subsystem and required data storage. In certain embodiments, these metrics may be utilized in combination with each other.

The method 130 further includes limiting data (of a single dataset) associated with the plurality of coincidence events from the scan so that the data varies in a radial extent relative to a center of a field of view of the scan based on the additional information utilizing one of the methods 76, 82, and 108 (block 136). The data varies in the radial extent for the plurality of coincidence events based on different respective values for a numerical difference in detector rings along the longitudinal axis between a first detector and a second detector detecting a respective coincidence event. In certain embodiments, the data may be limited just utilizing the additional information.

In certain embodiments, limiting the data associated with the plurality of coincidence events is based both on the additional information and on an axial angle for each respective coincidence event, wherein the axial angle is between a line of response of the respective coincidence event and a line parallel to a vertical axis, the vertical axis being orthogonal to the longitudinal axis, and the axial angle varies radially relative to the center of the field of view for each respective value for the numerical difference. In certain embodiments, both the additional information and the known spatial support of the imaged subject may be utilized in limiting the data associated with a plurality of coincidence events (i.e., determining the radial bins to utilize).

The method 130 further includes reconstructing a PET scan image from the limited data (varying in radial extent) (block 138). Utilization of the limited data with the variable radial extent (i.e., more useful information) improves image quality.

Technical effects of the disclosed subject matter include improving the quality of PET raw data (e.g., in list mode or in histogram mode) that is captured for a given amount of memory. Technical effects also include reducing the demands on the acquisition system (of a PET imaging system), reducing necessary storage, and/or reducing computational burden on image reconstruction. This can lead to reduced system cost, reduced data storage needed, and decreased reconstruction computation time. Technical effects further include improving image quality.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

This written description uses examples to disclose the present subject matter, including the best mode, and also to enable any person skilled in the art to practice the invention, including making and using any devices or systems and performing any incorporated methods. The patentable scope of the present subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for limiting coincidence data, comprising:
    detecting a plurality of coincidence events during a scan of a subject with a detector array of a positron emission tomography (PET) scanner, wherein the PET scanner comprises a plurality of detector rings disposed along a longitudinal axis of the PET scanner, and each detector ring comprises a plurality of detectors; and
    limiting data associated with the plurality of coincidence events from the scan so that the data varies in a radial extent relative to a center of a field of view of the scan.

2. The method of claim 1, wherein the data varies in the radial extent for the plurality of coincidence events based on different respective values for a numerical difference in detector rings along the longitudinal axis between a first detector and a second detector detecting a respective coincidence event.

3. The method of claim 2, wherein limiting the data associated with the plurality of coincidence events is based on an axial angle for each respective coincidence event, wherein the axial angle is between a line of response of the respective coincidence event and a line parallel to a vertical axis, the vertical axis being orthogonal to the longitudinal axis, and the axial angle varies radially relative to the center of the field of view for each respective value for the numerical difference.

4. The method of claim 3, wherein the limiting the data comprises storing only the data where the axial angle is at or below an axial angle limit, wherein the data stored varies in the radial extent.

5. The method of claim 4, wherein the data is stored in histogram mode or list mode.

6. The method of claim 3, further comprising storing all of the data associated with the plurality of coincidence events from the scan, and wherein limiting the data comprises selecting and utilizing only the stored data in reconstructing a PET scan image where the axial angle is at or below an axial angle limit for the stored data, wherein the stored data selected and utilized in reconstruction varies in the radial extent.

7. The method of claim 6, wherein all of the data is stored in histogram mode or list mode.

8. The method of claim 2, wherein limiting the data associated with the plurality of coincidence events comprises:
    obtaining anatomical scan data of the subject;
    extracting boundaries of the subject based on the anatomical scan data;
    mapping the boundaries to the data associated with the plurality of coincidence events to determine a radial range for the radial extent of the data that covers at least the subject; and
    storing the data falling within the radial range, wherein the stored data varies in the radial extent.

9. The method of claim 8, wherein the stored data is stored as a ragged matrix or a vector along with a lookup table identifying the radial range for each projection angle.

10. A system for limiting coincidence data, comprising:
    a memory encoding processor-executable routines;
    a processor configured to access the memory and to execute the processor-executable routines, wherein the processor-executable routines, when executed by the processor, cause the processor to:
        detect a plurality of coincidence events during a scan of a subject with a detector array of a positron emission tomography (PET) scanner, wherein the PET scanner comprises a plurality of detector rings disposed along a longitudinal axis of the PET scanner, and each detector ring comprises a plurality of detectors; and
        limit data associated with the plurality of coincidence events from the scan so that the data varies in a radial extent relative to a center of a field of view of the scan.

11. The system of claim 10, wherein the data varies in the radial extent for the plurality of coincidence events based on different respective values for a numerical difference in detector rings along the longitudinal axis between a first detector and a second detector detecting a respective coincidence event.

12. The system of claim 11, wherein limiting the data associated with the plurality of coincidence events is based on an axial angle for each respective coincidence event, wherein the axial angle is between a line of response of the respective coincidence event and a line parallel to a vertical axis, the vertical axis being orthogonal to the longitudinal axis, and the axial angle varies radially relative to the center of the field of view for each respective value for the numerical difference.

13. The system of claim 12, wherein the limiting the data comprises storing only the data where the axial angle is at or below an axial angle limit, wherein the data stored varies in the radial extent.

14. The system of claim 13, wherein the data is stored in histogram mode or list mode.

15. The system of claim 12, wherein the processor-executable routines, when executed by the processor, cause the processor to store all of the data associated with the plurality of coincidence events from the scan, and wherein limiting the data comprises selecting and utilizing only the stored data in reconstructing a PET scan image where the axial angle is at or below an axial angle limit for the stored data, wherein the stored data selected and utilized in reconstruction varies in the radial extent.

16. The system of claim 15, wherein all of the data is stored in histogram mode or list mode.

17. The system of claim 11, wherein limiting the data associated with the plurality of coincidence events comprises:
    obtaining anatomical scan data of the subject;
    extracting boundaries of the subject based on the anatomical scan data;
    mapping the boundaries to the data associated with the plurality of coincidence events to determine a radial range for the radial extent of the data that covers at least the subject; and
    storing the data falling within the radial range, wherein the stored data varies in the radial extent.

18. The system of claim 17, wherein the stored data is stored as a ragged matrix or a vector along with a lookup table identifying the radial range for each projection angle.

19. A non-transitory computer-readable medium, the non-transitory computer-readable medium comprising processor-executable code that when executed by a processor, causes the processor to:
    detect a plurality of coincidence events during a scan of a subject with a detector array of a positron emission tomography (PET) scanner, wherein the PET scanner comprises a plurality of detector rings disposed along a longitudinal axis of the PET scanner, and each detector ring comprises a plurality of detectors;
    limit data associated with the plurality of coincidence events from the scan so that the data varies in a radial extent relative to a center of a field of view of the scan, wherein the data varies in the radial extent for the plurality of coincidence events based on different respective values for a numerical difference in detector rings along the longitudinal axis between a first detector and a second detector detecting a respective coincidence event.

20. The non-transitory computer-readable medium of claim 19, wherein limiting the data associated with the plurality of coincidence events is based on an axial angle for each respective coincidence event, wherein the axial angle is between a line of response of the respective coincidence event and a line parallel to a vertical axis, the vertical axis being orthogonal to the longitudinal axis, and the axial angle varies radially relative to the center of the field of view for each respective value for the numerical difference.

* * * * *